US012638975B2

(12) United States Patent
Jain et al.

(10) Patent No.: US 12,638,975 B2
(45) Date of Patent: May 26, 2026

(54) METHOD AND SYSTEM FOR DISTRIBUTING AND MANAGING IO IN A DISAGGREGATED STORAGE ARCHITECTURE

(71) Applicant: SAMSUNG ELECTRONICS CO., LTD., Suwon-si (KR)

(72) Inventors: Preetham Parshwanath Jain, Benaluru (IN); Arun George, Bengaluru (IN); Dinesh Ratra, Bengaluru (IN); Parag Jain, Bengaluru (IN); Rohit Kailash Sharma, Bengaluru (IN); Roshan R Nair, Bengaluru (IN); Shivam, Bengaluru (IN); Vishak Guddekoppa, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 238 days.

(21) Appl. No.: 18/089,163

(22) Filed: Dec. 27, 2022

(65) Prior Publication Data

US 2023/0205424 A1    Jun. 29, 2023

(30) Foreign Application Priority Data

Dec. 27, 2021    (IN) .............................. 202141061007
Dec. 21, 2022    (IN) .............................. 202141061007

(51) Int. Cl.
*G06F 3/06* (2006.01)
(52) U.S. Cl.
CPC .......... *G06F 3/0613* (2013.01); *G06F 3/0604* (2013.01); *G06F 3/0634* (2013.01); *G06F 3/067* (2013.01)

(58) Field of Classification Search
CPC .... G06F 3/0613; G06F 3/0604; G06F 3/0634; G06F 3/067; G06F 3/0635; G06F 3/0679; G06F 3/061; G06F 3/0646; G06F 3/0658
See application file for complete search history.

(56) References Cited

U.S. PATENT DOCUMENTS 9,594,770 B1 *    3/2017    Kushmerick ....... G06F 16/1727
2019/0102093 A1 *    4/2019    Parnell ................ G06F 11/2007
(Continued)

FOREIGN PATENT DOCUMENTS

CN    106873907 B    *    4/2020    ............. G06F 3/061

*Primary Examiner* — Rocio Del Mar Perez-Velez
*Assistant Examiner* — Julian S Mendel
(74) *Attorney, Agent, or Firm* — Sughrue Mion, PLLC

(57) ABSTRACT
A method for distributing and managing an Input/Output (IO) request in a disaggregated storage architecture includes receiving the IO request including IO data to be distributed in the disaggregated storage architecture, generating IO metadata corresponding to the IO data included in the received IO request, determining one or more controller parameters for each of a plurality of controllers of the disaggregated storage architecture, determining a first priority weight of each controller parameter of the one or more controller parameters based on a network type of the disaggregated storage architecture, determining a first IO management weight for each of the plurality of controllers based on the one or more controller parameters and corresponding first priority weights, and statically mapping each of the IO metadata and the IO data to at least one controller of the plurality of controllers based on the first IO management weights of the plurality of controller.

18 Claims, 11 Drawing Sheets

(56) References Cited

U.S. PATENT DOCUMENTS

2020/0363988 A1*  11/2020  Szczepanik ......... G06F 13/4027
2023/0125240 A1*   4/2023  Wang ................... G06F 3/0631
711/154

* cited by examiner

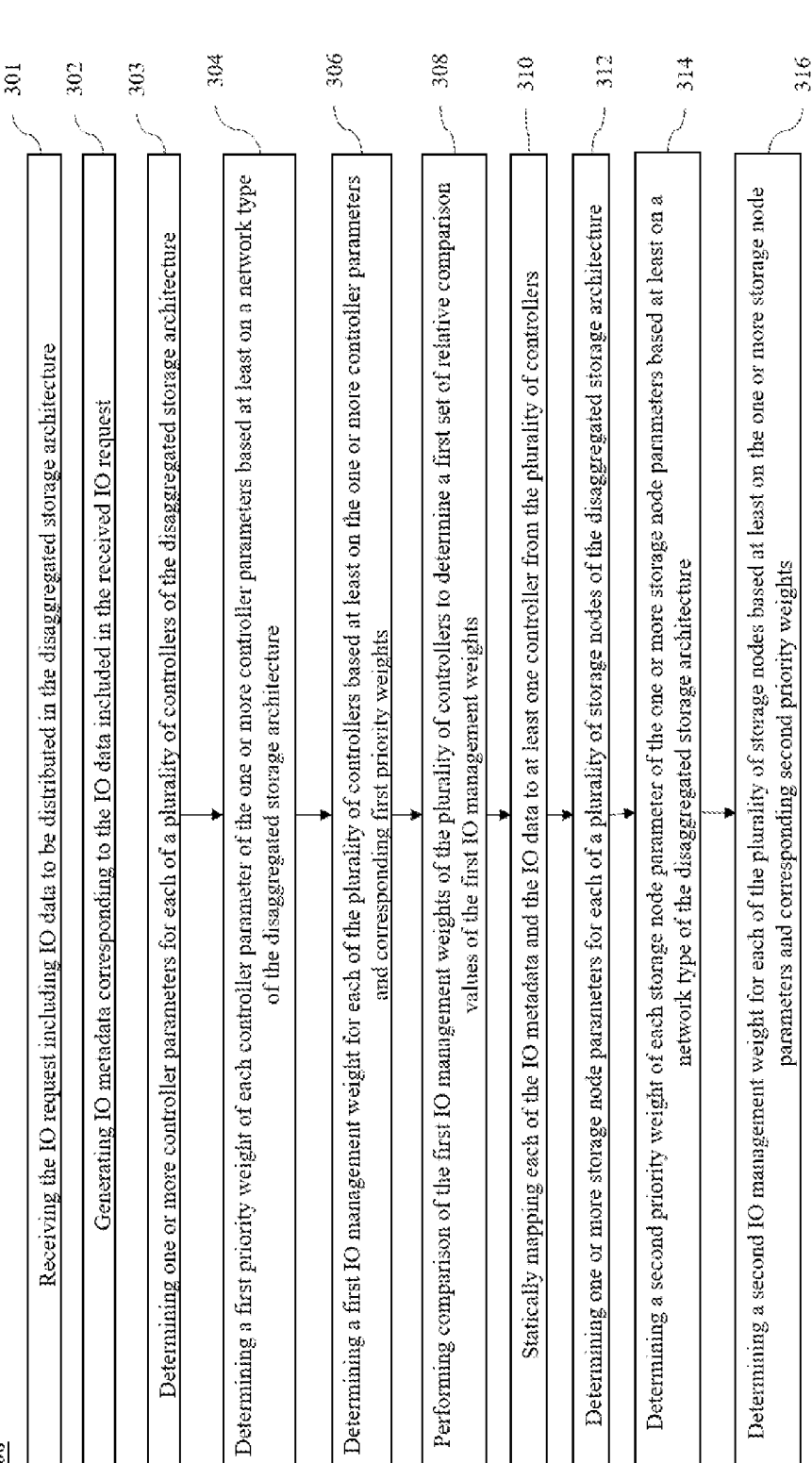

300

Receiving the IO request including IO data to be distributed in the disaggregated storage architecture — 301

Generating IO metadata corresponding to the IO data included in the received IO request — 302

Determining one or more controller parameters for each of a plurality of controllers of the disaggregated storage architecture — 303

Determining a first priority weight of each controller parameter of the one or more controller parameters based at least on a network type of the disaggregated storage architecture — 304

Determining a first IO management weight for each of the plurality of controllers based at least on the one or more controller parameters and corresponding first priority weights — 306

Performing comparison of the first IO management weights of the plurality of controllers to determine a first set of relative comparison values of the first IO management weights — 308

Statically mapping each of the IO metadata and the IO data to at least one controller from the plurality of controllers — 310

Determining one or more storage node parameters for each of a plurality of storage nodes of the disaggregated storage architecture — 312

Determining a second priority weight of each storage node parameter of the one or more storage node parameters based at least on a network type of the disaggregated storage architecture — 314

Determining a second IO management weight for each of the plurality of storage nodes based at least on the one or more storage node parameters and corresponding second priority weights — 316

FIG. 3B

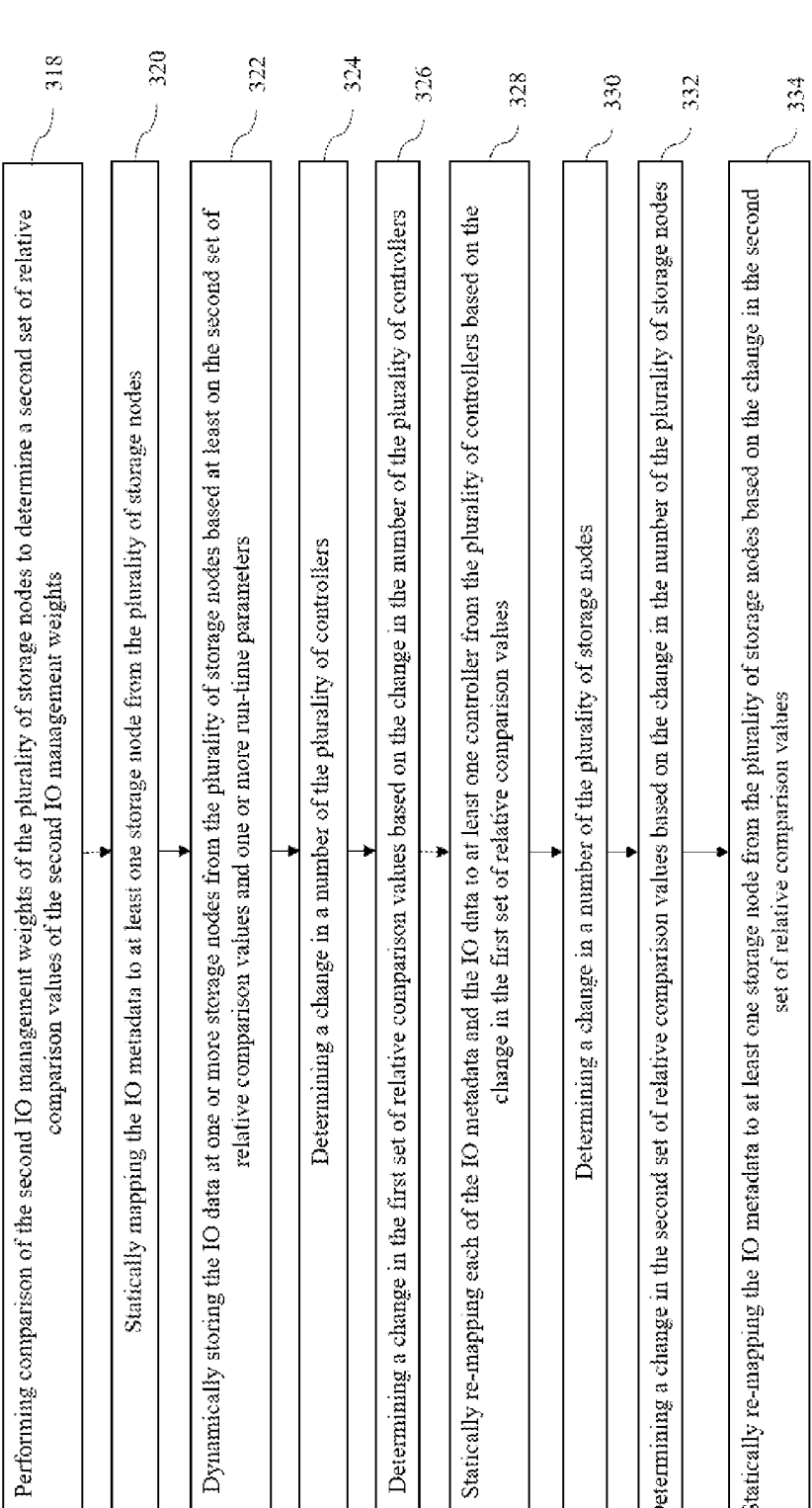

300

318 — Performing comparison of the second IO management weights of the plurality of storage nodes to determine a second set of relative comparison values of the second IO management weights 320 — Statically mapping the IO metadata to at least one storage node from the plurality of storage nodes 322 — Dynamically storing the IO data at one or more storage nodes from the plurality of storage nodes based at least on the second set of relative comparison values and one or more run-time parameters 324 — Determining a change in a number of the plurality of controllers 326 — Determining a change in the first set of relative comparison values based on the change in the number of the plurality of controllers 328 — Statically re-mapping each of the IO metadata and the IO data to at least one controller from the plurality of controllers based on the change in the first set of relative comparison values 330 — Determining a change in a number of the plurality of storage nodes 332 — Determining a change in the second set of relative comparison values based on the change in the number of the plurality of storage nodes 334 — Statically re-mapping the IO metadata to at least one storage node from the plurality of storage nodes based on the change in the second set of relative comparison values

FIG. 4

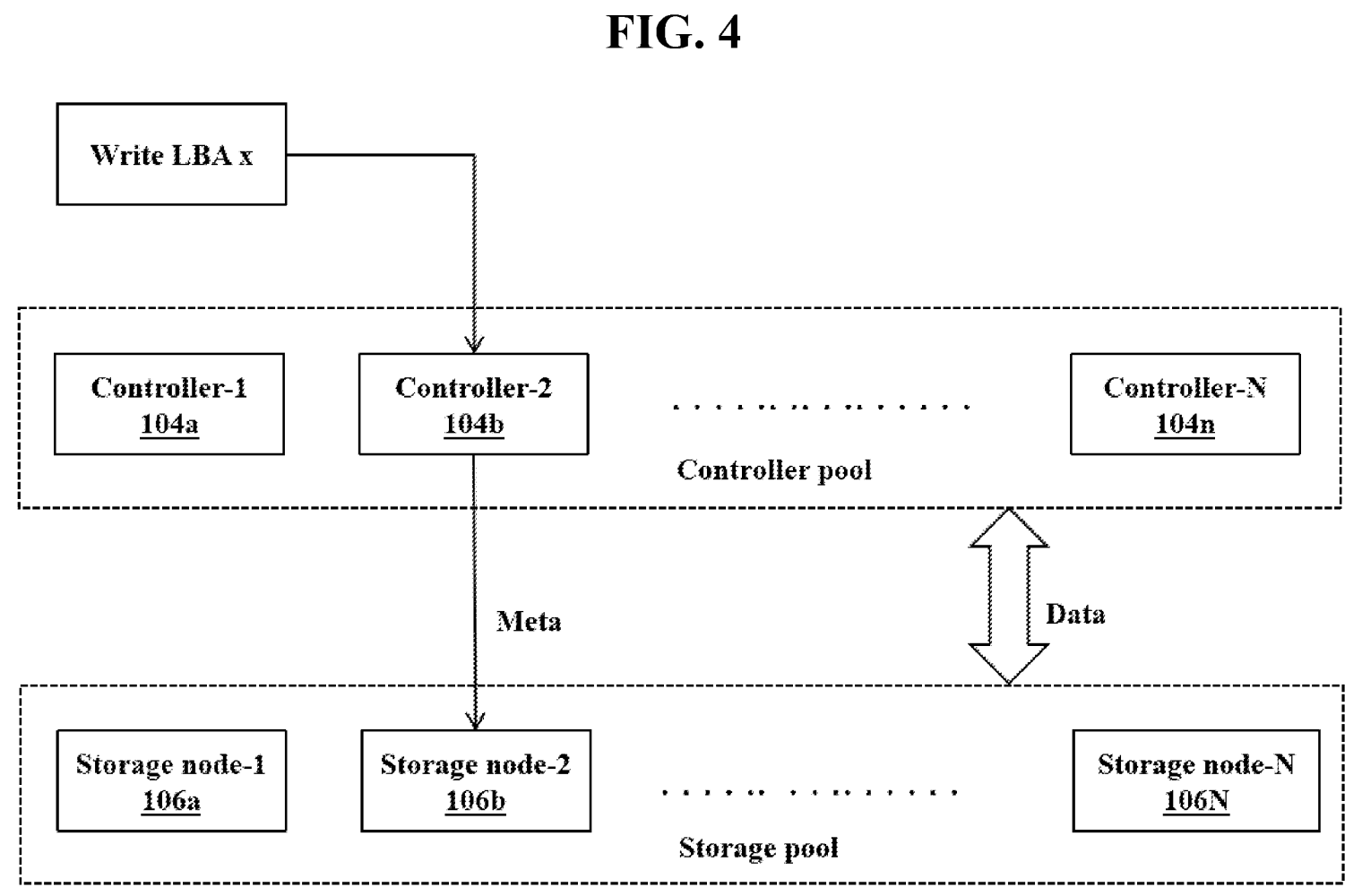

Write LBA x

Controller-1
104a

Controller-2
104b

Controller-N
104n

Controller pool

Meta

Data

Storage node-1
106a

Storage node-2
106b

Storage node-N
106N

Storage pool

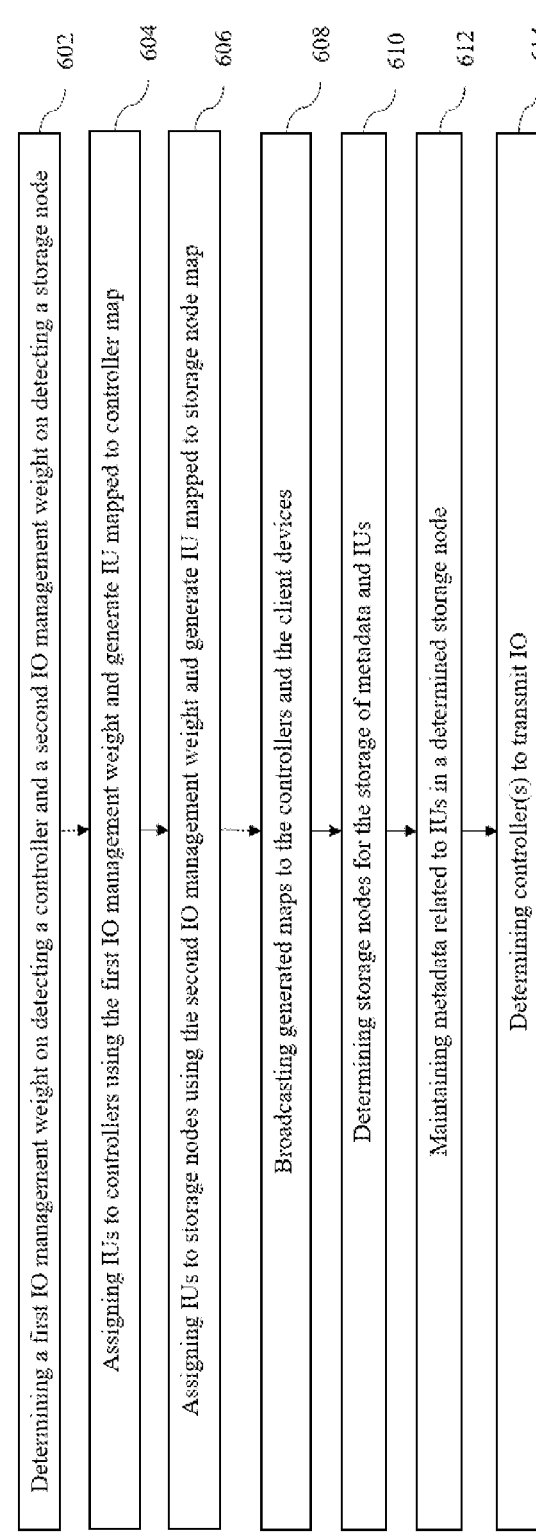

600

Determining a first IO management weight on detecting a controller and a second IO management weight on detecting a storage node — 602

Assigning IUs to controllers using the first IO management weight and generate IU mapped to controller map — 604

Assigning IUs to storage nodes using the second IO management weight and generate IU mapped to storage node map — 606

Broadcasting generated maps to the controllers and the client devices — 608

Determining storage nodes for the storage of metadata and IUs — 610

Maintaining metadata related to IUs in a determined storage node — 612

Determining controller(s) to transmit IO — 614

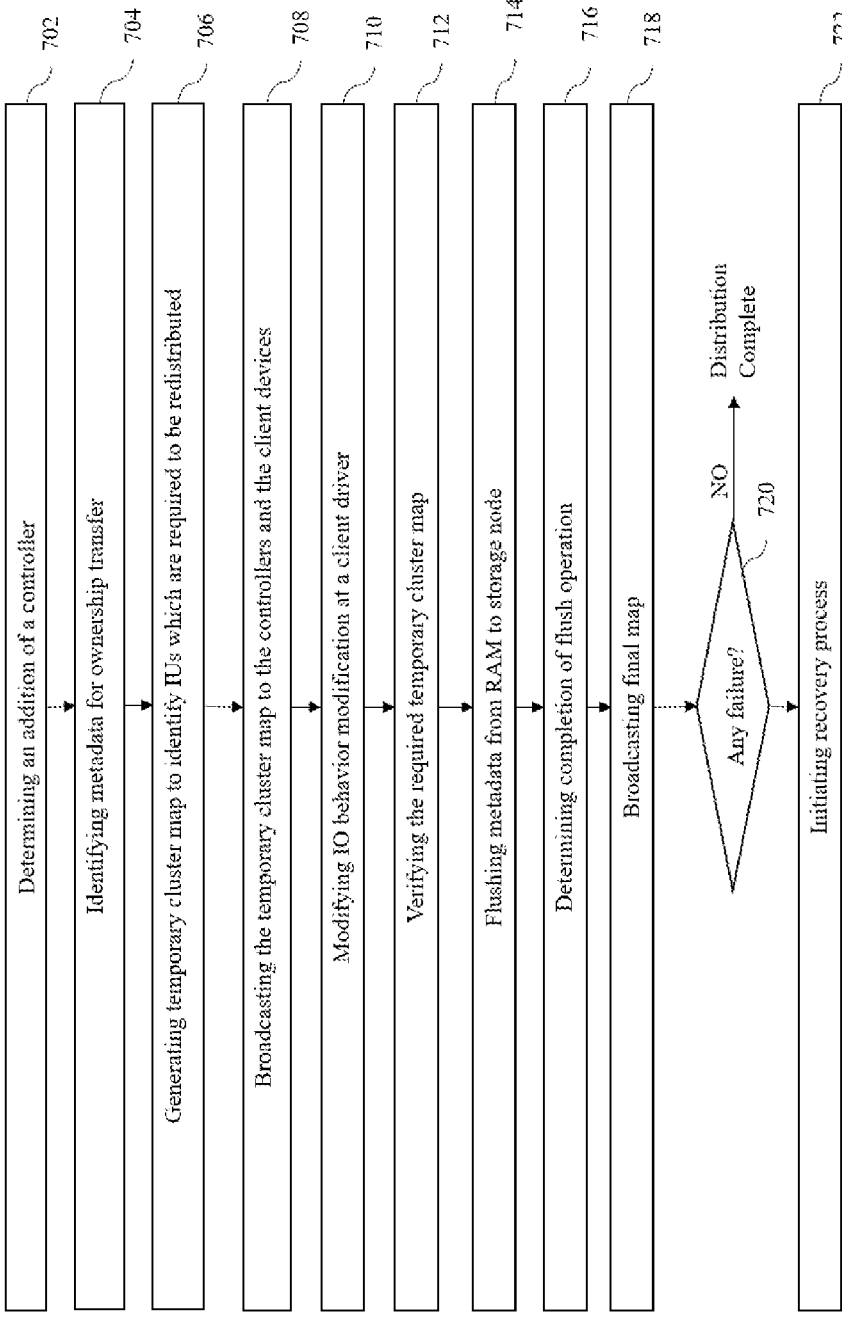

700

Determining an addition of a controller — 702

Identifying metadata for ownership transfer — 704

Generating temporary cluster map to identify IUs which are required to be redistributed — 706

Broadcasting the temporary cluster map to the controllers and the client devices — 708

Modifying IO behavior modification at a client driver — 710

Verifying the required temporary cluster map — 712

Flushing metadata from RAM to storage node — 714

Determining completion of flush operation — 716

Broadcasting final map — 718

Any failure? — 720

NO → Distribution Complete

Initiating recovery process — 722

FIG. 8

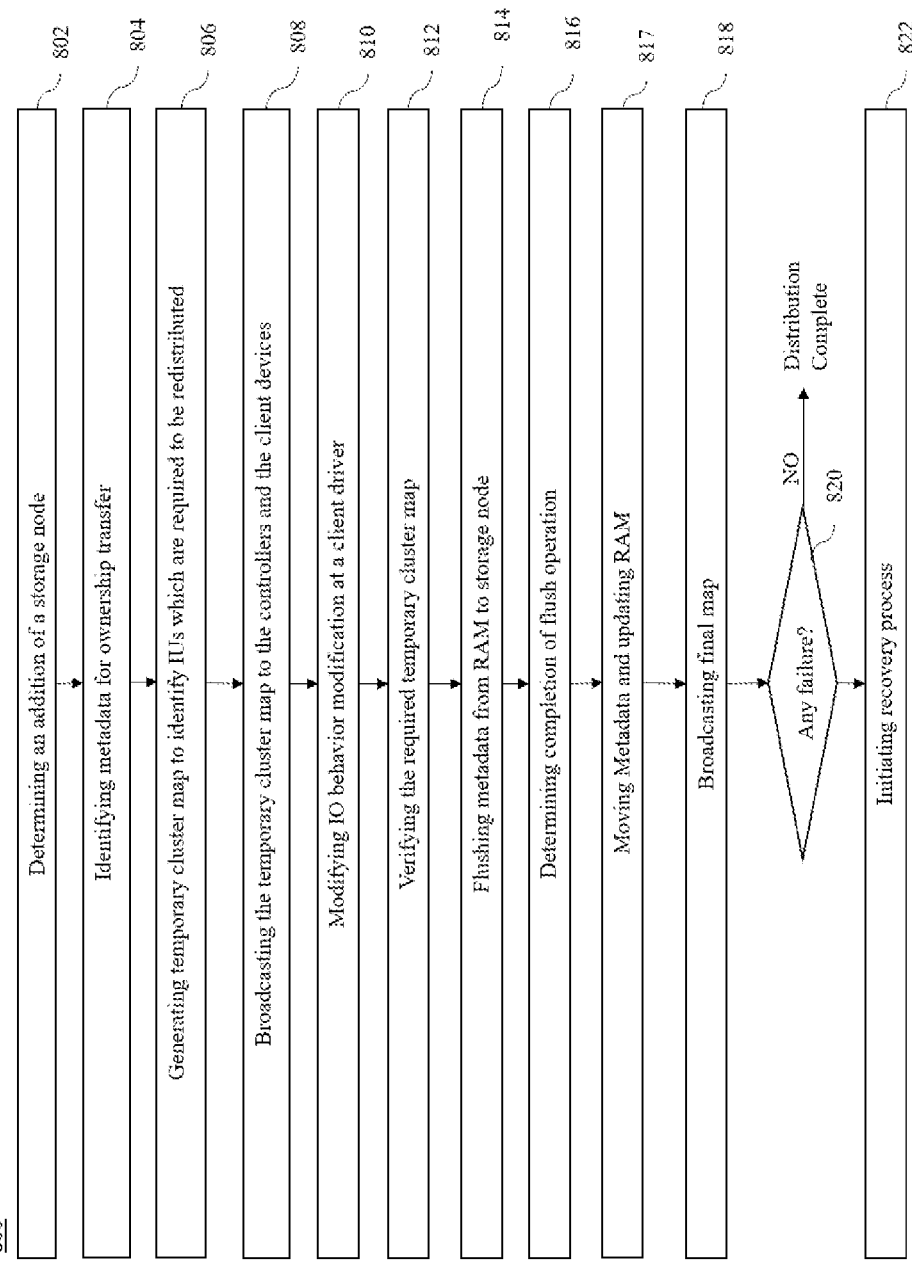

800

Determining an addition of a storage node — 802

Identifying metadata for ownership transfer — 804

Generating temporary cluster map to identify IUs which are required to be redistributed — 806

Broadcasting the temporary cluster map to the controllers and the client devices — 808

Modifying IO behavior modification at a client driver — 810

Verifying the required temporary cluster map — 812

Flushing metadata from RAM to storage node — 814

Determining completion of flush operation — 816

Moving Metadata and updating RAM — 817

Broadcasting final map — 818

Any failure? — 820

NO → Distribution Complete

Initiating recovery process — 822

FIG. 9

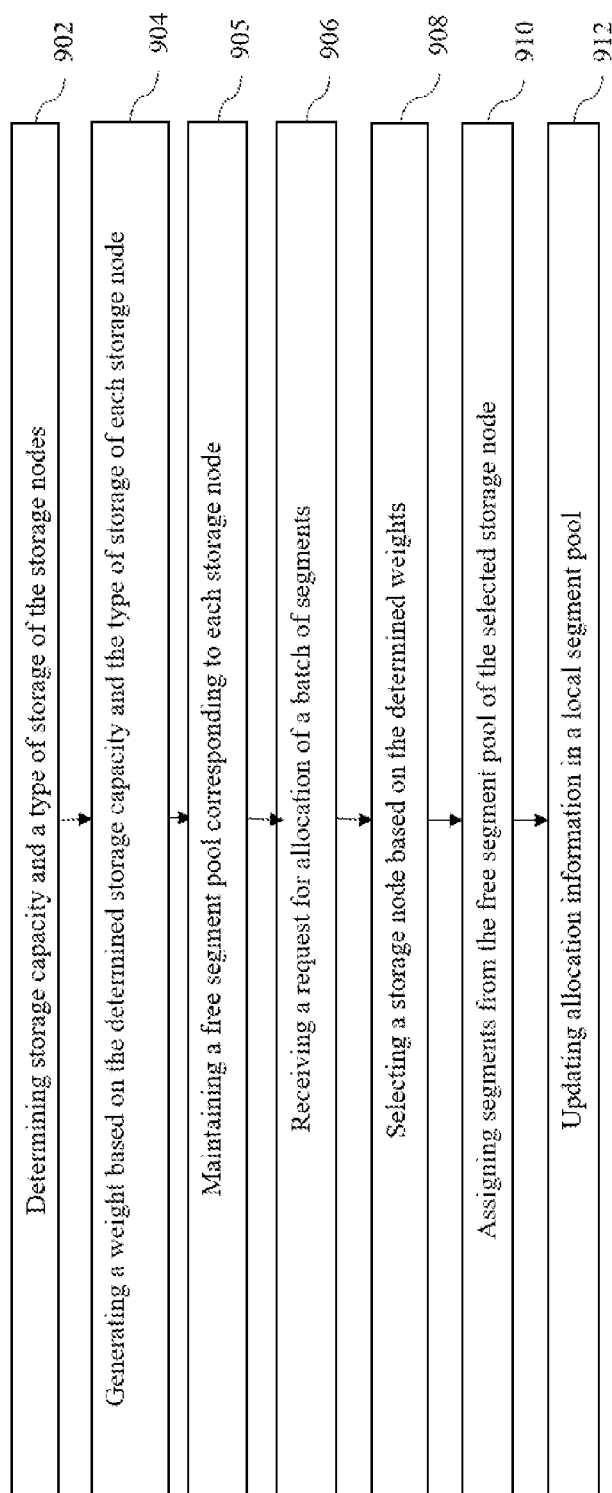

902   Determining storage capacity and a type of storage of the storage nodes

904   Generating a weight based on the determined storage capacity and the type of storage of each storage node 905   Maintaining a free segment pool corresponding to each storage node 906   Receiving a request for allocation of a batch of segments 908   Selecting a storage node based on the determined weights 910   Assigning segments from the free segment pool of the selected storage node 912   Updating allocation information in a local segment pool

METHOD AND SYSTEM FOR DISTRIBUTING AND MANAGING IO IN A DISAGGREGATED STORAGE ARCHITECTURE

CROSS-REFERENCE IO RELATED APPLICATION(S)

This application is based on and claims priority to Indian Complete Patent Application No. 202141061007, filed on Dec. 21, 2022, in the Indian Patent Office, and Indian Provisional Patent Application No. 202141061007, filed on Dec. 27, 2021, in the Indian Patent Office, the disclosures of which are incorporated herein by reference in their entireties.

BACKGROUND

1. Field

Example embodiments of the present disclosure relate to distributed storage management, and in particular, to methods and systems for distributing and managing Input/Output (IO) including IO metadata and IO data in a disaggregated storage architecture

2. Description of Related Art

New challenges, such as emergence of new age workloads, e-commerce demands, asymmetric scaling, and increased adoption of flash storage devices, have necessitated development of a disaggregated storage system architecture. Also, workloads associated with e-commerce platforms are becoming unpredictable, and demands on storage and computing capabilities vary with time. Further, consumers are willing to use available over-the-shelf servers and storage devices, which offer flexibility to add resources of any capacity. Conventional data storage systems fail to meet the aforesaid requirements. Moreover, the emergence of quad-level cell (QLC) solid-state drive (SSD) as a cheaper alternative to hard disk drives (HDD) has resulted in increasing adoption of flash devices in enterprise storage devices. Due to lower endurance, cluster level endurance management becomes more challenging. The aforementioned challenges demand for the disaggregated storage system architecture which can manage flash devices at scale to cater to low endurance flash such as QLC SSD, penta level cell (PLC) SSD, provide flexibility in resource addition to cater to e-commerce needs, manage heterogeneous storages and controllers to allow for asymmetric scaling, and provide flexibility in deployment to cater to the new age workloads.

A distributed storage architecture includes a plurality of storage nodes for a plurality of clients with a mechanism for data synchronization and coordination among such storage nodes. Therefore, the distributed storage architecture provides remote management of storage nodes through disaggregation. Further, such disaggregation enables cluster level flash management. However, the challenges in the cluster level flash management lie in providing efficiency aware, flash aware, resource aware, and capacity aware distribution and scaling methods.

In general, such architecture follows two paradigms: a share nothing paradigm or a share everything paradigm. In the share nothing paradigm, data and associated metadata are statically mapped to the storage nodes and controllers. However, the share nothing paradigm is not flash friendly. Further, in the share everything paradigm, the data and associated metadata are mapped to any of the storage nodes or controllers. However, the share everything paradigm creates challenges in synchronization for IO access. The synchronization challenges may be overcome using various kind of synchronization locks, but this incurs additional network traffic or expense.

Accordingly, there is a need to overcome at least the above challenges in a distributed storage architecture.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide a method and system for flash-aware distributed storage disaggregation.

Additional aspects will be set forth in part in the description which follows and, in part, will be apparent from the description, or may be learned by practice of the presented embodiments.

According to an aspect of an example embodiment, a method for distributing and managing an Input/Output (IO) request in a disaggregated storage architecture may include receiving the IO request including IO data to be distributed in the disaggregated storage architecture, generating IO metadata corresponding to the IO data included in the received IO request, determining one or more controller parameters for each of a plurality of controllers of the disaggregated storage architecture, determining a first priority weight of each controller parameter of the one or more controller parameters based on a network type of the disaggregated storage architecture, determining a first IO management weight for each of the plurality of controllers based on the one or more controller parameters and corresponding first priority weights, and statically mapping each of the IO metadata and the IO data to at least one controller of the plurality of controllers based on the first IO management weights of the plurality of controllers.

According to an aspect of an example embodiment, a system for distributing and managing an IO request in a disaggregated storage architecture may include a plurality of client devices configured to generate the IO request including IO data to be distributed in the disaggregated storage architecture, a plurality of controllers coupled with the plurality of client devices, the plurality of controllers configured to receive the IO request from the plurality of client devices and generate IO metadata corresponding to the IO data included in the received IO request, a plurality of storage nodes coupled with the plurality of client devices and the plurality of controllers, and one or more cluster management modules coupled with the plurality of client devices, the plurality of controllers and the plurality of storage nodes, the one or more cluster management modules configured to determine one or more controller parameters for each of the plurality of controllers of the disaggregated storage architecture, determine a first priority weight of each controller parameter of the one or more controller parameters based on a network type of the disaggregated storage architecture, determine a first IO management weight for each of the plurality of controllers based on the one or more controller parameters and corresponding first priority weights, and statically map each of the IO metadata and the IO data to at least one controller of the plurality of controllers based on the first IO management weights of the plurality of controllers.

According to an aspect of an example embodiment, a method of a disaggregated storage architecture may include receiving an IO request including IO data, generating IO metadata corresponding to the IO data, determining at least one controller parameter for each of a plurality of controllers, determining a priority weight for the at least one controller parameter, determining an IO management weight based on the at least one controller parameter and corresponding priority weights, and mapping the IO metadata and the IO data to at least one controller of the plurality of controllers based on the IO management weight.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 1 illustrates an environment of a disaggregated storage architecture, according to an example embodiment of the present disclosure;

FIGS. 3A and 3B are flowcharts illustrating a method for distributing and managing input/output (IO) in the disaggregated storage architecture, according to an example embodiment of the present disclosure;

FIG. 4 illustrates a process flow of distribution and management of IO in the disaggregated storage architecture, according to an example embodiment of the present disclosure;

FIG. 5 illustrates a static IO distribution scenario for mapping IO metadata to controllers and storage nodes, according to an example embodiment of the present disclosure;

FIG. 6A is a flowchart illustrating a method in a static IO distribution scenario, according to an example embodiment of the present disclosure;

FIG. 6B illustrates a process flow of static IO distribution scenario, according to an example embodiment of the present disclosure;

FIG. 7 is a flowchart illustrating a method of addition of controller, according to an example embodiment of the present disclosure.

FIG. 8 is a flowchart illustrating a method of addition of storage node, according to an example embodiment of the present disclosure; and FIG. 9 is a flowchart illustrating a method for run time data distribution across storage nodes in a flash efficient manner, according to an example embodiment of the present disclosure.

DETAILED DESCRIPTION

Figure 2:
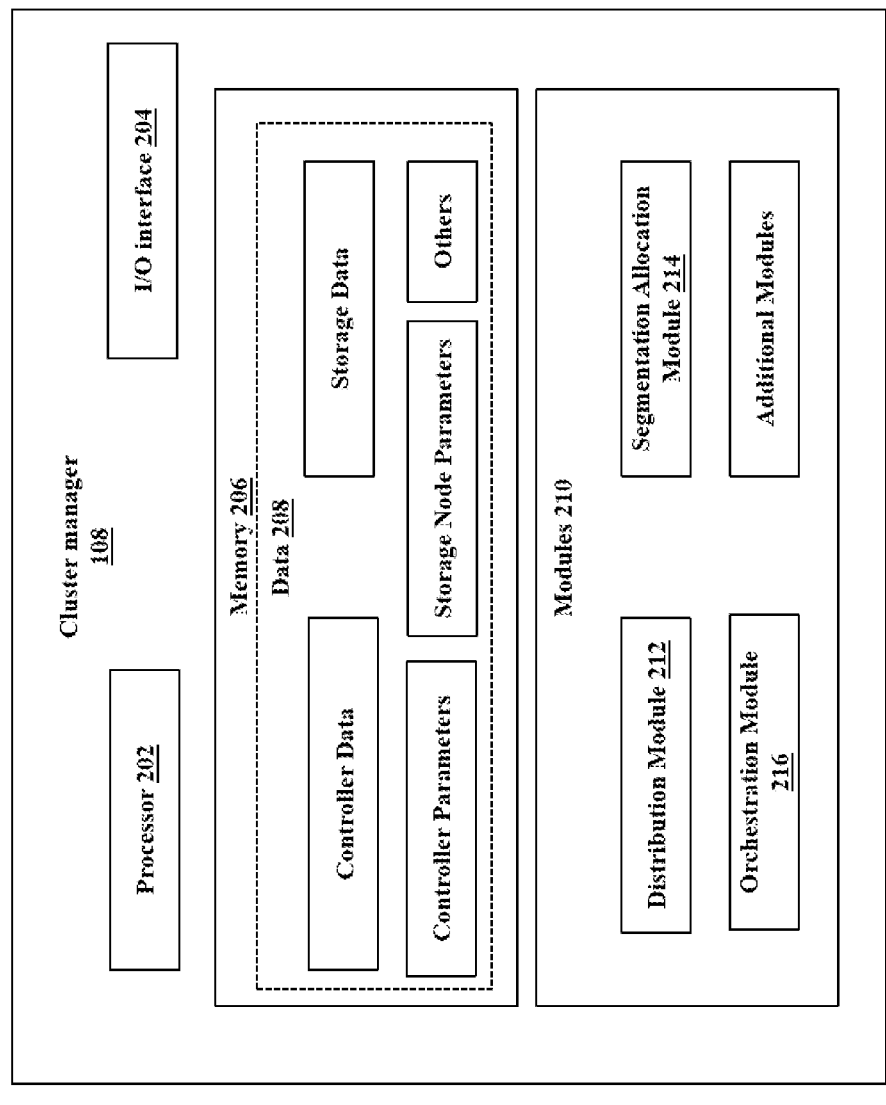
FIG. 2 illustrates a block diagram of a cluster manager, according to an example embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The term "some" as used herein may be defined as "none, or one, or more than one, or all." Accordingly, the terms "none," "one," "more than one," "more than one, but not all" or "all" would all fall under the definition of "some."

The terminology and structure employed herein is for describing, teaching, and illuminating embodiments and their specific features and elements, and does not limit, restrict, or reduce the spirit and scope of the claims or their equivalents.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

Unless otherwise defined, all terms, and especially any technical and/or scientific terms, used herein may be taken to have the same meaning as commonly understood by one having ordinary skill in the art.

Example embodiments of the present disclosure will be described below in detail with reference to the accompanying drawings.

Example embodiments of the present disclosure provide a method and a system for distributing and managing Input/Output (IO) including IO metadata and IO data in a disaggregated storage architecture based on IO management weights determined for each of the controller and storage node in the disaggregated storage architecture.

Figure 1:
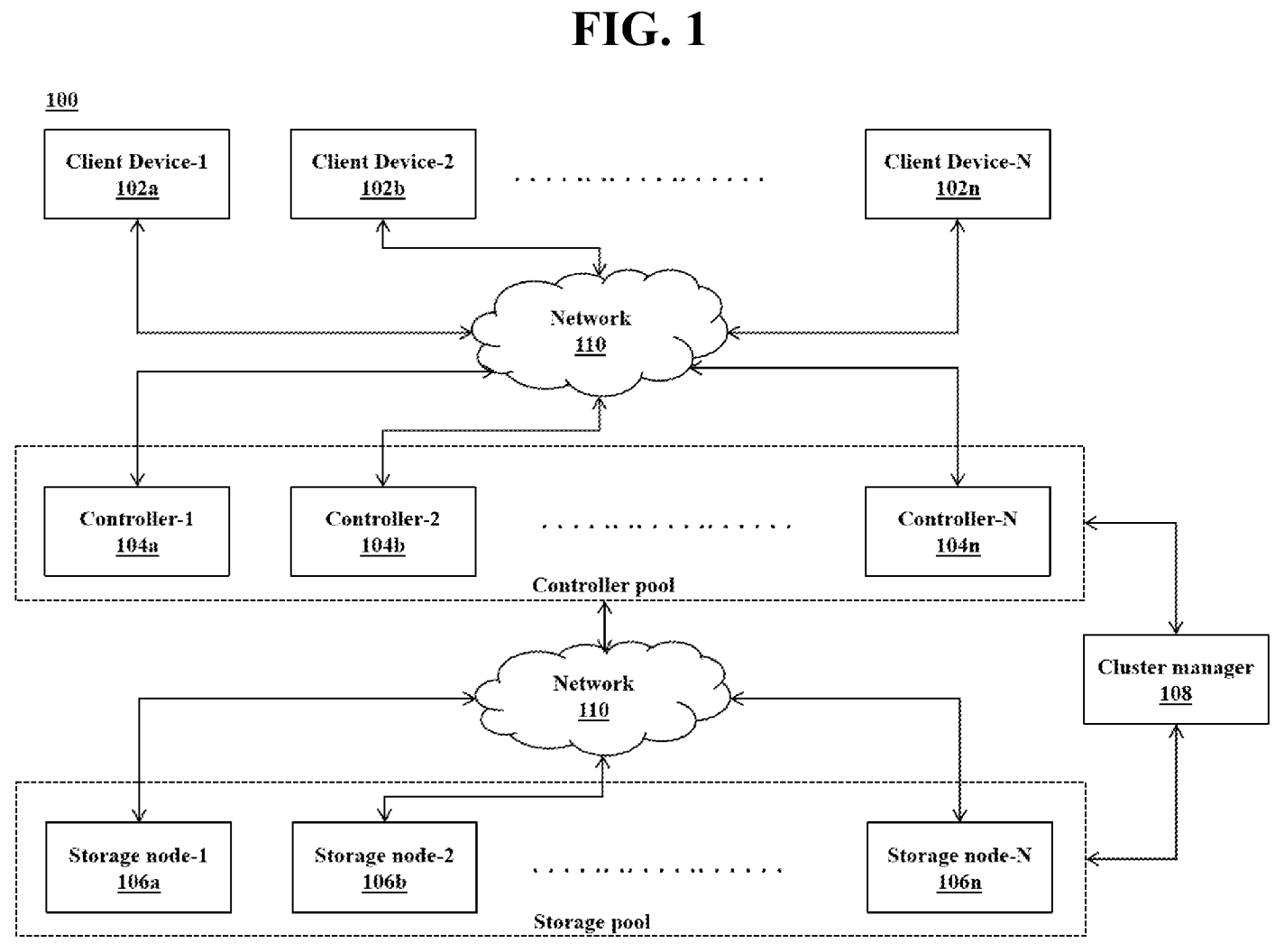

FIG. 1 illustrates an environment of a disaggregated storage architecture/system 100 (interchangeably referred to as "the architecture 100" or "the system 100"), according to an example embodiment of the present disclosure. The architecture 100 may include a plurality of client devices 102a-102n (collectively referred to as "the client device 102"), a plurality of controllers 104a-104n (collectively referred to as "the controllers 104") and a plurality of storage nodes 106a-106n (collectively referred to as "the storage nodes 106"). The architecture 100 may also include a cluster manager (CM) 108. In an example embodiment, the CM 108 may be coupled to the client device 102, the controller 104 or the storage nodes 106 via control paths may not interfere with the IO path.

The CM 108 may also be referred to as the cluster management module 108. Further, in the illustrated embodiment, only single CM 108 is shown. However, any number of CMs required to implement example embodiments the present disclosure may be included. The architecture 100 may include the plurality of storage nodes 106 to provide multiple storage areas to the client device 102. Further, the client device 102 may be configured to access the plurality of storage nodes 106 via the plurality of controllers 104.

In an example embodiment, the client device 102, the controller 104 and the storage nodes 106 may be operatively coupled to each other via a network 110. For example, the plurality of client devices 102, the plurality of controllers 104, and the plurality of storage nodes 106 may be coupled using nonvolatile memory express over Fabrics (NVMeOF) network 110. Further, the client device 102 may correspond to a device configured to generate an IO request for the controller 104. The IO request may require IO metadata and IO data to be stored in storage nodes 106. The client device 102 may be configured to forward IO requests to controllers 104 for performing read and/or write requests using the storage nodes 106. The client device 102 may include any suitable communication device such as, but not limited to, a mobile phone, a smart watch, a laptop computer, a desktop computer, a Personal Computer (PC), a notebook, a tablet, a server, and/or any other device configured to store and access data in the disaggregated storage architecture 100. In example embodiments, the client device 102 may also correspond to an application server configured to store and access data to and from the storage nodes 106. The client device 102 may include any suitable components such as, but not limited to, applications, hardware, and/or software drivers, configured to enable the client device 102 to access the disaggregated storage architecture 100. In an example embodiment, the client device 102 may include a client driver configured to act as an interface to an application installed at the client device 102. The client device 102 may be operatively coupled to the controllers 104 via the network 110 to distribute and manage IO at the storage nodes 106.

The controllers 104 may be configured to act as an interface between the client device 102 and the storage nodes 106. In an example embodiment, the controller 104 may be configured to receive IO request from the client device 102 and process and distribute the corresponding IO data and IO metadata to the storage nodes 106. The controllers 104 may correspond to any suitable computing devices such as, but not limited to, a laptop computer, a desktop computer, a server, and/or any other device configured to store and access data in the disaggregated storage architecture 100. In an example embodiment, the controller 104 may be configured to implement logics to process IO request from the client device 102 and maintain IO metadata. The controller 104 may be configured to distribute the IO data and IO metadata among the plurality of storage nodes 106.

The storage nodes 106 may be configured to provide storage space to store IO data and IO metadata. Example of the storage nodes 106 may include any suitable non-volatile memory, such as, but not limited to, read-only memory (ROM), erasable programmable ROM, flash memories, hard disks, optical disks, magnetic tapes, and so forth.

The CM 108 may be operatively coupled to each of the client device 102, the controllers 104 and the storage nodes 106. In an example embodiment, the CM 108 may be configured to manage one or more clusters comprising the controllers 104 and the storage nodes 106. The CM 108 may be configured to perform cluster management of the cluster which includes operations/events such as, but not limited to, addition and/or deletion of controllers, addition and/or deletion of storage nodes, IO distribution and controller/storage node failure. The CM 108 and the client driver may facilitate storage disaggregation. A detailed explanation of various operations of the CM 108 is explained in the following description.

To perform flash aware distribution in a manner which prevents the necessity of use of any sort of synchronization mechanism between controllers, the system 100 may be configured to distribute IO metadata statically among the controllers 104 and the storage nodes 106, while at the same time distributing IO data dynamically across the storage nodes 106. The system 100 may also configured to consider controller and storage capabilities while performing the static distribution and also provide mechanisms to change static distribution at run time when there is a controller or storage addition/deletion. Further, the system 100 may perform global data distribution using flash aware central allocation. The global data distribution may allow distribution of data across all storage nodes to efficiently use flash resources. The above stated objectives may be achieved using central allocation management, run time resource, and capacity aware data segment distribution. The various operations of the system 100 may be explained in the following description.

FIG. 2 illustrates a block diagram of the CM 108, according to an example embodiment of the present disclosure. In an example embodiment, the CM 108 may be implemented independently and remotely coupled with the client device 102, the controllers 104 and the storage nodes 106. In example embodiments, the CM 108 may be implemented at any suitable device such as, the client device 102, the controller 104, or the storage node 106.

The CM 108 may include a processor 202, an IO interface 204, a memory 206 storing data 208 and the modules 210. As an example, the processor 202 may be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 may be configured to fetch and execute computer-readable instructions and data stored in the memory. The processor 202 may include one or a plurality of processors. The processor 202 may be implemented as one processor or a plurality of processors. The processor 202 may be a general-purpose processor, such as a central processing unit (CPU), an application processor (AP), or the like, a graphics-only processing unit such as a graphics processing unit (GPU), a visual processing unit (VPU), and/or an artificial intelligence (AI)-dedicated processor such as a neural processing unit (NPU). The processor 202 may control the processing of the input data in accordance with a predefined operating rule stored in the non-volatile memory and/or the volatile memory, i.e., the memory 206. The predefined operating rule may be provided through training or learning.

The processor 202 may be in communication with one or more input/output (I/O) devices via the I/O interface 204. The I/O interface 204 may employ communication code-division multiple access (CDMA), high-speed packet access (HSPA+), global system for mobile communications (GSM), long-term evolution (LTE), WiMAX, or the like, etc. In an example embodiment, using the I/O interface 204, the CM 108 may communicate with one or more I/O devices such as the client devices 102 which are configured to generate the IO requests. The processor 202 may be in communication with a communication network 110 via a network interface. In an example embodiment, the network interface may be the I/O interface 204.

The memory 206 may include any non-transitory computer-readable medium known in the art including, for example, volatile memory, such as static random access memory (SRAM) and dynamic RAM (DRAM), and/or non-volatile memory, such as ROM, erasable programmable ROM, flash memories, hard disks, optical disks, and magnetic tapes. The memory 206 may be configured to store data 208. The data 208 may include controller-related data, storage node related data, controller parameters, storage node parameters and other additional information which may be required to implement the desired functionality of the CM 108.

The modules 210 may be configured to perform one or more desired functions of the CM 108. The modules 210 may include a distribution module 212, a segmentation allocation module 214, an orchestration module 216 and one or more additional modules based on the requirement. The distribution module 212 may be configured to implement logic to perform static IO distribution to the controllers 104 and the storage nodes 106. The segmentation module 214 may be configured to implement logic to flash aware segmentation of the storage nodes 106. The orchestration module 216 may be configured to implement logic to perform controller scaling and/or storage node scaling, according to embodiments of the present disclosure. Further, the modules 210 may include one or more additional modules configured to implement any additional logic to achieve the desired objective of the CM.

FIGS. 3A and 3B are flowcharts of a method 300 for distributing and managing IO in the disaggregated storage architecture, according to an example embodiment of the present disclosure. The operations of the method 300 may be performed by at least one of the controllers 104, the storage nodes 106, or the CM 108 of the system 100.

The method 300 may be explained based on an assumption that the client device 102 has generated an IO request including IO data. In operation 301, the method 300 may include receiving the IO request including IO data to be distributed in the disaggregated storage architecture. In an example embodiment, the controller 104 and/or the CM 108 may receive the IO request from the client device 102. In operation 302, the method 300 may include generating IO metadata corresponding to the IO data included in the received IO request. In an example embodiment, IO metadata may include information corresponding to storage of IO data to the storage nodes 106.

In operation 303, the method 300 may include determining one or more controller parameters for each of the plurality of controllers 104 of the disaggregated storage architecture 100. The controller parameters may correspond to configurational parameters of the controllers 104 which may define the capability of the controllers 104. Examples of the controller parameters may include, but not limited to, a number of CPU cores, a capacity of random access memory (RAM), a capacity of network interface card (NIC), frequency of CPUs, a type of cache memory. In an example embodiment, the CM 108 may determine the one or more controller parameters corresponding to each of the plurality of the controller 104.

In operation 304, the method 300 may include determining a first priority weight of each controller parameter of the one or more controller parameters based at least on a network type of the disaggregated storage architecture. For example, Table 1 illustrates a difference in priority weight of different controller parameters based on different networks:

TABLE 1

| Network Type | Controller Parameters |
| --- | --- |
| Disaggregated -TCP | CPU = NIC = RAM |
| Disaggregated - RDMA | RAM > NIC > CPU |

Table 1 illustrates that for a disaggregated—transmission control protocol (TCP) based network, each of the controller parameters may have equal weightage. However, for a disaggregated—remote direct memory access (RDMA) based network, RAM capacity may have higher priority weightage than the NIC capacity and the cores of CPUs. Further, for the disaggregated-RDMA, NIC capacity may have higher priority weightage than the cores of CPUs. In example embodiments, the priority weight of different controller parameters may be determined based on other factors such as, but not limited to, deployment type, workload, and transport structure.

In operation 306, the method 300 may include determining a first IO management weight for each of the plurality of controllers 104 based at least on the one or more controller parameters and corresponding first priority weights. In an example embodiment, to determine the first IO management weight, the method may include generating an attribute matrix "$A_c$" for the controllers 104 based on the controller parameters, as shown in Equation (1)

$$A_c = \begin{pmatrix} cpu_1 & ram_1 & nic_1 & \dots \\ cpu_2 & ram_2 & nic_2 & \dots \\ \vdots & \vdots & \ddots & \vdots \\ cpu_N & ram_N & nic_N & \dots \end{pmatrix} \tag{1}$$

The controller parameters illustrated in the attribute matrix $A_c$ are exemplary in nature and the attribute matrix $A_c$ may include any number of the controller parameters. Further, the method 300 may include normalizing the controller parameters and calculating a weighted average. Further, the method 300 may include generating a weight matrix $W_c = (w_{ci})$, based on Equation (2), in which $w_{ci}$ may represent the first IO management weight of the $i^{th}$ controller.

$$w_{ci} = \alpha_1 * cpu_i + \alpha_2 * ram_i + \alpha_3 * nic_i \tag{2}$$

$\alpha_1$, $\alpha_2$, and $\alpha_3$ may represent priority weights of the corresponding controller parameters which may be determined based on Table 1.

In operation 308, the method 300 may include performing comparison of the first IO management weights of the plurality of controllers 104 to determine a first set of relative comparison values of the first IO management weights. The first set of relative comparison values may indicate a difference in the first IO management weights of the controllers 104 and therefore may indicate a difference in capabilities of the different controllers 104.

In operation 310, the method 300 may include statically mapping each of the IO metadata and the IO data to at least one controller 104 from the plurality of controllers 104 based on the first IO management weights of the plurality of controllers 104. Specifically, the method 300 may include statically mapping each of the IO metadata and the IO data to at least one controller 104 from the plurality of controllers 104 based on the first set of relative comparison values.

In operation 312, the method 300 may include determining one or more storage node parameters for each of a plurality of storage nodes of the disaggregated storage architecture. The storage node parameters may correspond to configurational parameters of the storage nodes 106 which may define the capability of the storage nodes 106. Examples of the storage node parameters may include, but not limited to, space availability of storage node, a capacity of RAM, a capacity of NIC, and metadata space availability. In an example embodiment, the CM 108 may determine the one or more storage node parameters corresponding to each of the plurality of the storage nodes 106.

In operation 314, the method 300 may include determining a second priority weight of each storage node parameter of the one or more storage node parameters based at least on a network type of the disaggregated storage architecture. For example, Table 2 (as shown below) illustrates a difference in priority weight of different storage node parameters based on different networks:

TABLE 2

| Network Type | Storage node Parameters |
|---|---|
| Disaggregated -TCP | CPU = NIC > Space |
| Disaggregated - RDMA | NIC > CPU > Space |

Table 2 illustrates that for a disaggregated—TCP based network, the storage node parameters CPU cores and NIC capacity may have equal weightage, however each of the storage node parameters CPU cores and NIC capacity may have higher weightage than availability of the space. In example embodiments, the priority weight of different storage node parameters may be determined based on other factors such as, but not limited to, deployment type, workload, and transport structure.

In operation 316, the method 300 may include determining a second IO management weight for each of the plurality of storage nodes 106 based at least on the one or more storage node parameters and corresponding second priority weights. In an example embodiment, to determine the second IO management weight, the method may include generating an attribute matrix "$A_s$" for the storage nodes 106 based on the storage node parameters, as shown in Equation (3).

$$A_s = \begin{pmatrix} space_1 & ram_1 & nic_1 & \dots \\ space_2 & ram_2 & nic_2 & \dots \\ \vdots & \vdots & \ddots & \vdots \\ space_N & ram_N & nic_N & \dots \end{pmatrix} \quad (3)$$

The storage node parameters illustrated in the attribute matrix $A_s$ are exemplary in nature and the attribute matrix $A_s$ may include any number of the storage node parameters. Further, the method 300 may include normalizing the storage node parameters and calculating a weighted average. Further, the method 300 may include generating a weight matrix $W_s=(w_{si})$, based on Equation (4), in which $w_{si}$ may represent the second IO management weight of the $i^{th}$ storage node.

$$w_{si}=\alpha_1*space_i+\alpha_2*ram+\alpha_3*nic_i \quad (4)$$

$\alpha_1$, $\alpha_2$, and $\alpha_3$ may represent priority weights of the corresponding storage node parameter which may be determined based on Table 2.

In operation 318, the method 300 may include performing comparison of the second IO management weights of the plurality of storage nodes 106 to determine a second set of relative comparison values of the second IO management weights. The second set of relative comparison values may indicate a difference in the second IO management weights of the storage nodes 106 and therefore may indicate a difference in capabilities of the different storage nodes 106.

In operation 320, the method 300 may include statically mapping the IO metadata to at least one storage node from the plurality of storage nodes 106 based on the second IO management weights of the plurality of storage nodes 106. Specifically, the method 300 may include statically mapping the IO metadata to at least one storage node from the plurality of storage nodes 106 based on the second set of relative comparison values.

In operation 322, the method 300 may include dynamically storing the IO data at one or more storage nodes from the plurality of storage nodes 106 based at least on the second set of relative comparison values and one or more run-time parameters. The run-time parameters may include parameters such as, but not limited to, current capacity of the storage node and flash endurance.

In operation 324, the method 300 may include determining a change in a number of the plurality of controllers 104. The change in the number of the plurality of controllers 104 may indicate an addition or a deletion of one or more controllers from the cluster. In operation 326, the method 300 may include determining a change in the first set of relative comparison values based on the change in the number of the plurality of controllers 104. For the addition of a controller, the method may include determining controller parameters corresponding to the added controller and determining a first IO placement weight for the added controller based on the determined controller parameters and priority weights of the controller parameters. Further, the method 300 may include determining the change in the first set of relative comparison values based on the determined first IO placement weight of the added controller and the first IO placement weights of the previous controllers. Further, for the deletion of a controller, the method 300 may include determining the change in the first set of relative comparison values based on the first IO placement weights of the remaining controllers.

In operation 328, the method 300 may include statically re-mapping each of the IO metadata and the IO data to at least one controller from the plurality of controllers 104 based on the change in the first set of relative comparison values.

Next in operation 330, the method 300 includes determining a change in a number of the plurality of storage nodes 106. The change in the number of the plurality of storage nodes 106 may indicate an addition or a deletion of one or more storage nodes from the cluster. In operation 332, the method 300 may include determining a change in the second set of relative comparison values based on the change in the number of the plurality of storage nodes 106. For the addition of a storage node, the method 300 may include determining storage node parameters corresponding to the added storage node and determining a second IO placement weight for the added storage node based on the determined storage node parameters and priority weights of the storage node parameters. Further, the method may include determining the change in the second set of relative comparison values based on the determined first IO placement weight of the added storage node and the second IO placement weights of the previous storage nodes. Further, for the deletion of a storage node, the method 300 may include determining the change in the second set of relative comparison values based on the second IO placement weights of the remaining storage nodes 106.

In operation 334, the method 300 may include statically re-mapping the IO metadata to at least one storage node from the plurality of storage nodes 106 based on the change in the second set of relative comparison values.

The operations of the method 300 as shown in FIGS. 3A-3B may occur in variations to the sequence in accordance with various example embodiments. The variation may include addition and/or omission of operations illustrated in FIGS. 3A-3B.

FIG. 4 illustrates a process flow depicting a method for distributing and managing IO in the disaggregated storage architecture, according to an example embodiment of the present disclosure. The method may be implemented by the one or more components of the system 100. FIG. 4 may be explained in conjunction with FIGS. 1-3B. The method may include receiving a write logical block address (LBA) command from the client device 102. The LBA command may correspond to the IO request including IO data and IO metadata. A first level distribution of IO request may be based on the first IO management weight and the second IO management weight corresponding to each of the controllers 104 and the storage nodes 106, respectively, which selects a controller and a storage node for IO management (IO metadata placement). The method may include a second level dynamic run-time, flash-aware distribution of IO request based on a run time IO placement weight which selects a storage node for IO placement (IO data storage), as explained in operation 322 of FIG. 3B. Further, the method may include orchestrating a run time re-distribution of IO management on addition/deletion of controller/storage nodes, as explained in operations 324-334 of FIG. 3B. In an example embodiment, the process flow may indicate a flow of IO data and IO metadata upon reception of the IO request. Further, as the method may include performing run-time selection of the storage nodes for IO placement based on flash awareness and distribution of only IO metadata, the system 100 may be flash friendly, (i.e., the system 100 may be able to effectively utilize flash devices without impacting the lifespan of the device). Moreover, according to an example embodiment, the IO metadata may be statically segregated, and example embodiments of the present disclosure may avoid the need to have an additional synchronization mechanism. Further, example embodiments of the present disclosure may enable easy re-distribution of IO metadata at run-time.

Figure 5:
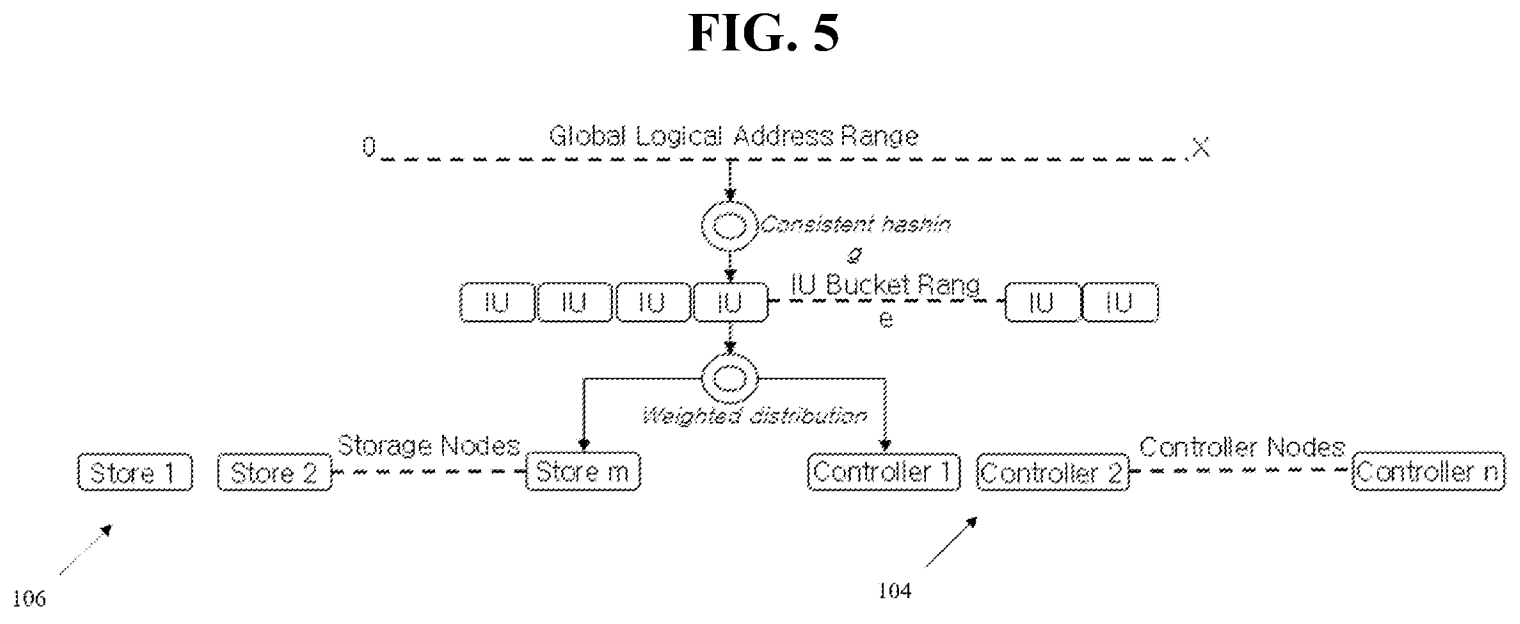

FIG. 5 illustrates a static IO distribution scenario for mapping IO metadata to controllers and storage nodes, according to an embodiment of the present disclosure. In an example embodiment, the static metadata distribution scheme may enable selection of a controller 104 and a storage node 106 for IO management. As illustrated in FIG. 5, the global logical address range may include continuous logical block addresses. The range 0 to x may be determined by a total available space in a cluster for writing data. The global logical address range may be divided into distribution stripes (DStripes). When IO for a logical block address needs to be performed, its D-Stripe may be found. The D-Stripe may be subjected to consistent hashing to hash into buckets called indivisible unit (IU). The IU may be a metadata unit which stores metadata belonging to the D-Stripe and the IU metadata is grouped together. The IUs may be mapped to the storage nodes 106 and the controllers 104 using weighted distribution, as explained above in FIGS. 3A-3B.

Figure 6B:
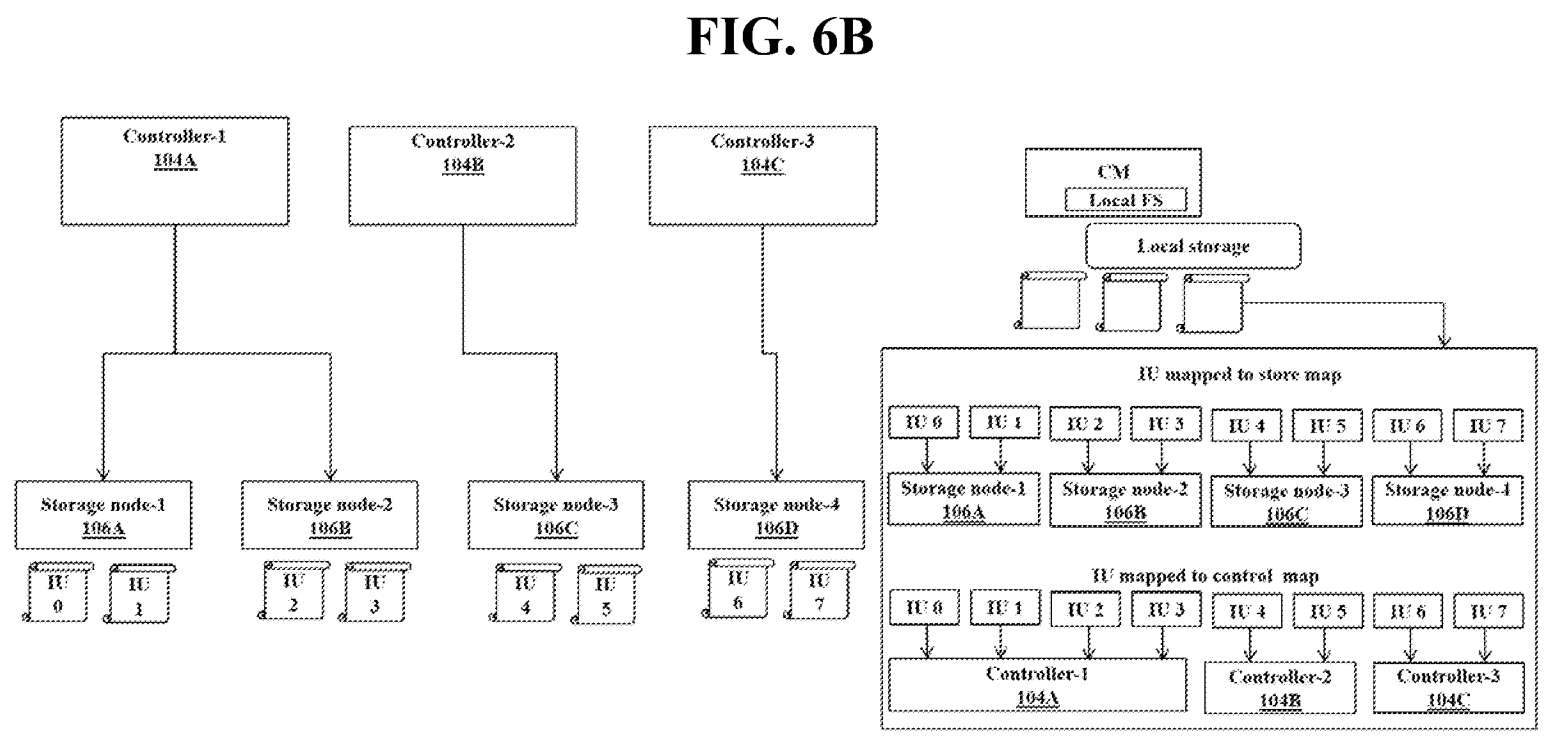

FIG. 6A is a flowchart illustrating a method in a static IO distribution scenario, according to an example embodiment of the present disclosure. FIG. -6B illustrates a process flow of static IO distribution scenario, according to an example embodiment of the present disclosure. Specifically, FIG. 6A illustrates an example method 600 for static IO distribution scenario. The static IO distribution may be performed using cluster maps, such as an IU mapped to store (storage node) map and an IU mapped to controller map. In operation 602, the CM 108 may determine a first IO management weight on detecting a controller and a second IO management weight on detecting a storage node. The first and second IO management weights may be determined as defined in reference to FIGS. 3A-3B. In operation 604, the CM 108 may assign IUs to controllers using the first IO management weight and generate an IU mapped to the controller map. In operation 606, the CM 108 may assign IUs to storage nodes using the second IO management weight and generate an IU mapped to the storage node map. That is, the CM 108 may use the first IO management weight of the controllers 104 to map the IU to the controllers and generate an IU mapped to controller map, as illustrated in FIG. 6B. Further, the CM 108 may use the second IO management weight of the storage nodes 106 to map the IU to the stores (storage nodes) and generate an IU mapped to store map, as illustrated in FIG. 6B. In operation 608, the CM 108 may broadcast both the generated maps to the controllers 104 and the client devices 102. In operation 610, the controller 104 may use the maps to determine storage node(s) for the IO metadata and the IUs under the ownership of the controller 104. In operation 612, the controller 104 may mount a file system over metadata partitions in the storage nodes 106 under the ownership of the controller 104 to maintain metadata related to IUs in the determined storage nodes 106. The controller 104 may generate IU files for storing IO metadata belonging to the IU. Further in operation 614, a client driver associated with each of the client devices 102 may use the maps to determine the controller 104 to send the IO.

Referring to FIG. 6B, eight IUs (IU0-IU7) may be mapped to four storage nodes (storage nodes 106A-106D) and three controllers (controller 104A-104C). In an example embodiment, the mapping of the IUs to the storage nodes and the controllers may be performed based on the corresponding IO management weights of the storage nodes and controllers, respectively. In the exemplary embodiment, two IUs may be mapped to each of the storage nodes. For example, IU0-IU1 may be mapped to the storage node 106A, IU2-IU3 may be mapped to the storage node 106B, IU4-IU5 may be mapped to the storage node 106C, and IU6-IU7 may be mapped to the storage node 106D. Further, four out of eight IUs (IU0-IU3) may be mapped to the controller 104A, two IUs (IU4-IU5) may be mapped to the controller 104B and remaining two IUs (IU6-IU7) may be mapped to the controller 104C. Further, there may be any number of IUs mapped to any number of controllers and the storage nodes, as per the requirement.

FIG. 7 is a flowchart illustrating a method 700 of addition of controller, according to an example embodiment of the present disclosure. The addition of a controller(s) may also be referred to as controller scaling. The controller scaling may include movement of ownership of IO metadata from existing controllers to newly added controllers based on distribution logic. In operation 702, the method 700 may include determining an addition of a controller. In operation 704, IO metadata for ownership transfer may be identified. The IO metadata to be migrated or requiring an ownership change may be determined based on the distribution logic determined from the method 300. In operation 706, based on the identified IO metadata, a temporary cluster map may be generated which may be used for identifying old and new controller(s) for a given IO metadata. The method 700 may include handling inflight IOs. The logic to handle IOs (inflight IOs) which access or update the meta, which are being migrated or whose ownership is being transferred, may be required to prepare the controller 104 and client driver in this regard. Handling the inflight IOs may include a temporary cluster map broadcast, as shown in operation 708. The temporary cluster map may be shared to all client devices and controllers before any metadata redistribution commences. Using the temporary map, any entity may decipher that a metadata redistribution will commence shortly. By comparing the temporary map and the previous map, a client driver may recognize the source and target controllers involved in metadata redistribution.

Handling the inflight IOs may include IO behavior modification at the client driver, as indicated in operation 710. When the client driver receives the temporary map, its write behavior may be altered. For controller scaling operation, the client driver may initiate sending write commands whose metadata ownership is being transferred, to new controller. This ensures that metadata for inflight IOs are updated at the right storage. For storage scaling operation, the client driver may send writes IO metadata belonging to the controller that is being migrated, to both source and target controllers. This ensures that metadata for inflight IOs are updated at both source and destination storages. If the new storage fails during scaling, the metadata may be recovered from the old storage. For storage scaling operation, the client driver may set a duplicate bit in the write command sent to source controller such that the data and metadata of the write commands may be cleaned after successful scaling.

Further, handling the inflight IOs may include read behavior alteration at client. When the client driver receives the temporary map, its read behavior may be altered. For controller scaling operation, the client driver may start sending read commands whose metadata ownership is being transferred, to new controller. The new controller may serve the read command if it has the metadata for it.

Alternatively, the new controller may reject the read command if it does not have the corresponding metadata. The client driver may resubmit the rejected read to the source controller. For storage scaling operation, client driver may send read commands to the source controller only, as it may be guaranteed to have the metadata.

Further, handling the inflight IOs may include handling map version mismatch. When temporary maps are broadcasted to all entities of the cluster, it is not guaranteed that all entities receive the map in order. This situation causes a cluster state where different entities are at different map versions for a brief period. To handle this, each IO from the client driver needs to carry a map version. This may be compared against the version of map in the controller. Table 3 summarizes various situations and corresponding action by client driver and controller.

TABLE 3

| Case | Controller Behavior |
|---|---|
| IO version = Controller version | Process IO |
| IO version < Controller version | Reject IO |
| IO version > Controller version | Process IO, Fetch latest map |

The method 700 may include executing metadata ownership transfer logic. The logic may ensure that old and new controller are prepared for handling inflight IOs and carry out ownership transfer. This may include verifying temporary cluster map version, as shown by operation 712. The method 700 may include determining whether old and new controller are at temporary map version by querying their map version. When it is determined both controllers are at same version, a flush command may be followed on old controller. A flush command may be sent to old controller.

The old controller may flush the metadata indicated by flush command to the storage node, as shown by operation 714. Further, RAM may be updated on new controller. An update command may be sent to the new controller. The new controller may read metadata from the storage and may update the RAM. Thus, the method 700 may include determining a completion of a flush operation, in that the new controller may receive metadata of all previously written write commands. Further in operation 718, the final map may be broadcast. After successful metadata ownership transfer, a new map version may be updated to a stable state and the new map may be broadcasted to all entities. Further, the client drivers may migrate from a temporary map to a new map and may initiate sending IOs as per metadata ownership indicated in the map.

The method 700 operations may also include executing failure recovery logic on new controller. In operation 720, the method 700 may include determining any failure in the system. Further, in case of failure, the method 700 may include initiating a recovery process (i.e., the previous stable map may be broadcast) in operation 722. All the inflight writes may be protected in the inflight IO logic and the corresponding metadata may be preserved.

Further, similar operations may also be performed for the deletion of controllers. Therefore, for the sake of brevity, a description of the same is omitted.

FIG. 8 is a flowchart illustration a method 800 of addition of storage node, according to an example embodiment of the present disclosure. The operations 802-816 and operations 818-822 of the method 800 are similar to operations 702-716 and 718-722 as explained in FIG. 7 and thus, a repetitive description has been omitted for the sake of brevity.

As illustrated in FIG. 8, the method 800 operations may further include executing metadata migration logic, in operation 817. The logic may ensure that source and target controllers are prepared for handling inflight IOs and carry out migration. This may include map version check, and flush command on source controller identical to metadata ownership transfer logic, as described above. Further, migration may be performed by target controller. The target controller may read metadata to be migrated from the source storage and may update the RAM. After updating the RAM, the target controller may flush the metadata to the new storage. Further, broadcasting new map may be performed identical to metadata ownership transfer logic, as described above. Further, clean up may be performed by source controller. After successful migration, source controller may be asked to clean up metadata and data of write commands whose duplicate bits are set in the IO metadata.

Further, similar steps may also be performed for the deletion of storage nodes. Therefore, for the sake of brevity, a description of the same is omitted. Furthermore, for during the deletion of storage nodes, the method 800 may also include moving the data from the storage node to be deleted to the remaining storage nodes.

FIG. 9 is a flowchart illustrating a method 900 for run time data distribution across storage nodes in a flash efficient manner, according to an example embodiment of the present disclosure.

In operation 902, the CM 108 may detect storage capacity in terms of segments or erase blocks and type of SSD of the storage nodes 106. In operation 904, the CM 108 may generate a weight based on various factors. The factors may include the determined storage capacity and the type of storage of each storage node. In operation 905, the CM 108 may maintain a free segment pool per storage node 106. In operation 906, the CM 108 may receive a request for allocation of a batch of segments from a controller 104. Size of the batch may be determined by its capabilities. The CM 108 may select a storage node using weights in operation 908. In operation 910, the CM 108 may assign segments from the free segment pool of the selected storage node. In operation 912, the controller 104 may update allocation information in local segment pool maintained in RAM.

Example embodiments of the present disclosure provide a method and system for flash-aware distributed storage disaggregation.

Example embodiments of the present disclosure provide for static mapping of controllers and storage for IO metadata management and IO metadata storage which enables flash aware data distribution without the need for synchronization between controllers.

Example embodiments of the present disclosure allow for all storage nodes to be uniformly helping flash endurance. Since allocation granularity is segment, it is easy to accommodate heterogeneous storage nodes with varying segment sizes. Weight based segment pool provides for uniform allocation even with heterogeneous storage nodes. Weight based segment pool allows efficient distribution even with different flash devices (QLC, PLC etc.).

Example embodiments of the present disclosure provide controller scaling and storage scaling using metadata redistribution. The metadata redistribution causes minimal write amplification for flash unlike data redistribution. It may be instantaneous. It may not require east-west traffic or storage level locks for coordination between controllers.

Example embodiments of the present disclosure provide stateless controller. It allows controllers to be location independent. This provides flexibility in deployment by changing certain policies such as distribution, etc., at the CM.

Example embodiments of the present disclosure provide deployment flexibility. It caters to different methods and technologies used for deployment of the same cluster.

Example embodiments of the present disclosure provide resource aware distribution. This caters to the use of commodity hardware.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Some example embodiments disclosed herein may be implemented using processing circuitry. For example, some example embodiments disclosed herein may be implemented using at least one software program running on at least one hardware device and performing network management functions to control the elements.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the operations of any flow diagram need not be implemented in the order shown; nor do all of the operations necessarily need to be performed. Also, those operations that are not dependent on other operations may be performed in parallel with the other operations. The scope of embodiments is no limited by these specific examples. Numerous variations, whether explicitly given in the specification or not, such as differences in structure, dimension, and use of material, are possible. Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A method for distributing and managing an Input/Output (IO) request in a disaggregated storage architecture, the method comprising:

receiving the IO request comprising IO data to be distributed in the disaggregated storage architecture;

generating IO metadata corresponding to the IO data included in the received IO request;

determining one or more controller parameters for each of a plurality of controllers of the disaggregated storage architecture, the plurality of controllers being operatively coupled to at least one client device of a plurality of client devices via a network of the disaggregated storage architecture;

determining a first priority weight of each controller parameter of the one or more controller parameters based on a network type of the network of the disaggregated storage architecture;

determining a first IO management weight for each of the plurality of controllers based on the one or more controller parameters and corresponding first priority weights; and statically mapping each of the IO metadata and the IO data to at least one controller of the plurality of controllers based on the first IO management weights of the plurality of controllers, determining one or more storage node parameters for each of a plurality of storage nodes of the disaggregated storage architecture, determining a second priority weight of each storage node parameter of the one or more storage node parameters based on the network type of the network of the disaggregated storage architecture, determining a second IO management weight for each of the plurality of storage nodes based on the one or more storage node parameters and corresponding second priority weights, determining a first set of relative comparison values of the second IO management weights by comparing the second IO management weights of the plurality of storage nodes, statically mapping the IO metadata to at least one storage node from the plurality of storage nodes based on the first set of relative comparison values, and dynamically storing the IO data at one or more storage nodes from the plurality of storage nodes based on the first set of relative comparison values.

2. The method of claim 1, wherein the one or more controller parameters correspond to configurational parameters, and wherein the configurational parameters comprise at least one of:
a number of central processing unit (CPU) cores,
a capacity of a random access memory (RAM),
a capacity of a network interface card (NIC), and
a frequency of CPUs.

3. The method of claim 1, further comprising:
comparing the first IO management weights;
determining, based on the comparison of the first IO management weights, a second set of relative comparison values of the first IO management weights, wherein the second set of relative comparison values comprises an indication of overall capability of each of the plurality of controllers; and
statically mapping each of the IO metadata and the IO data to at least one controller of the plurality of controllers based on the second set of relative comparison values.

4. The method of claim 3, further comprising:
determining a change in a number of the plurality of controllers;
determining a change in the second set of relative comparison values based on the change in the number of the plurality of controllers; and
statically re-mapping each of the IO metadata and the IO data to at least one controller of the plurality of controllers based on the change in the second set of relative comparison values.

5. The method of claim 4, wherein re-mapping each of the IO metadata and the IO data to at least one controller of the plurality of controllers comprises:
identifying IO data and IO metadata which are required to be re-mapped;
generating a first temporary cluster map based on the identified IO data and IO metadata, wherein the first temporary cluster map indicates a mapping of the IO data and IO metadata with the plurality of controllers after the change in the number of the plurality of controllers;
transmitting the generated first temporary cluster map; and
statically re-mapping the IO data and IO metadata based on the generated first temporary cluster map,
wherein the statically remapping the IO data and IO metadata comprises transferring of ownership of the IO data and IO metadata among the plurality of controllers.

6. The method of claim 1, wherein the first set of relative comparison values comprises an indication of overall capability of each of the plurality of storage nodes.

7. The method of claim 6, further comprising:
determining a caching requirement for the generated IO metadata based on size of the IO metadata;
determining a caching ability of the plurality of controllers based on the one or more controller parameters;
determining a caching sufficiency indication of each of the plurality of controllers based on a comparison of the determined caching requirement for the generated IO metadata and the caching ability of the plurality of controllers;
adjusting the mapping of each of the IO metadata and the IO data to the at least one controller of the plurality of controllers based on the determined caching sufficiency indication of the at least one controller; and adjusting the mapping of the IO metadata to at least one storage node from the plurality of storage nodes based on the determined caching sufficiency indication of the at least one controller.

8. The method of claim 6, further comprising:
determining a change in a number of the plurality of storage nodes;
determining a change in the first set of relative comparison values based on the change in the number of the plurality of storage nodes; and
migrating the IO metadata to a newly added storage node using the plurality of controllers based on the change in the first set of relative comparison values.

9. The method of claim 8, wherein migrating the IO metadata comprises:
identifying IO metadata which are required to be migrated;
generating a first temporary cluster map based on the identified IO metadata, the first temporary cluster map indicating a mapping of the IO metadata with the plurality of storage nodes after the change in the number of the plurality of storage nodes;
transmitting the generated first temporary cluster map; and
migrating the IO metadata based on the generated first temporary cluster map.

10. The method of claim 6, further comprising:
dynamically storing the IO data at one or more storage nodes of the plurality of storage nodes based on the first set of relative comparison values and one or more run-time parameters,
wherein the one or more run-time parameters are indicative of a real-time storage capability and a flash endurance of the one or more storage nodes in view of IO data.

11. The method of claim 1, wherein the one or more storage node parameters corresponds to configurational parameters, and
wherein the configurational parameters comprise at least one of:
a space availability of a storage node,
a capacity of a random access memory (RAM),
a capacity of a network interface card (NIC), and
metadata space availability.

12. A system for distributing and managing an Input/Output (IO) request in a disaggregated storage architecture, the system comprising:
a plurality of client devices configured to generate the IO request comprising IO data to be distributed in the disaggregated storage architecture;
a plurality of controllers coupled with the plurality of client devices via a network of the disaggregated storage architecture, the plurality of controllers configured to:
receive the IO request from the plurality of client devices; and
generate IO metadata corresponding to the IO data included in the received IO request;
a plurality of storage nodes coupled with the plurality of client devices and the plurality of controllers; and
one or more cluster management modules coupled with the plurality of client devices, the plurality of controllers and the plurality of storage nodes, the one or more cluster management modules configured to:
determine one or more controller parameters for each of the plurality of controllers of the disaggregated storage architecture;

determine a first priority weight of each controller parameter of the one or more controller parameters based on a network type of the network of the disaggregated storage architecture;

determine a first IO management weight for each of the plurality of controllers based on the one or more controller parameters and corresponding first priority weights; and statically map each of the IO metadata and the IO data to at least one controller of the plurality of controllers based on the first IO management weights of the plurality of controllers, determine one or more storage node parameters for each of a plurality of storage nodes of the disaggregated storage architecture, determine a second priority weight of each storage node parameter of the one or more storage node parameters based on the network type of the network of the disaggregated storage architecture, determine a second IO management weight for each of the plurality of storage nodes based on the one or more storage node parameters and corresponding second priority weights, determine a first set of relative comparison values of the second IO management weights by comparing the second IO management weights of the plurality of storage nodes, statically map the IO metadata to at least one storage node from the plurality of storage nodes based on the first set of relative comparison values, and dynamically store the IO data at one or more storage nodes from the plurality of storage nodes based on the first set of relative comparison values.

13. The system of claim 12, wherein the one or more controller parameters correspond to configurational parameters, the configurational parameters comprising at least one of:

a number of central processing unit (CPU) cores, a capacity of a random access memory (RAM), a capacity of a network interface card (NIC), and a frequency of CPUs.

14. The system of claim 12, wherein the one or more cluster management modules are configured to:

compare the first IO management weights;

determine, based on the comparison of the first IO management weights, a second set of relative comparison values of the first IO management weights, wherein the second set of relative comparison values comprises an indication of overall capability of each of the plurality of controllers; and statically map each of the IO metadata and the IO data to at least one controller of the plurality of controllers based on the second set of relative comparison values.

15. The system of claim 12, wherein the first set of relative comparison values comprises an indication of overall capability of each of the plurality of storage nodes.

16. The system of claim 15, wherein the one or more cluster management modules are further configured to:

determine a caching requirement for the generated IO metadata based on size of the IO metadata;

determine a caching ability of the plurality of controllers based on the one or more controller parameters;

determine a caching sufficiency indication of each of the plurality of controllers based on a comparison of the determined caching requirement for the generated IO metadata and the caching ability of the plurality of controllers;

adjust the mapping of each of the IO metadata and the IO data to the at least one controller of the plurality of controllers based on the determined caching sufficiency indication of the at least one controller; and adjust the mapping of the IO metadata to at least one storage node of the plurality of storage nodes based on the determined caching sufficiency indication of the at least one controller.

17. The system of claim 15, wherein the one or more cluster management modules are further configured to:

determine a change in a number of the plurality of storage nodes;

determine a change in the first set of relative comparison values based on the change in the number of the plurality of storage nodes; and migrate the IO metadata to a newly added storage node using the plurality of controllers based on the change in the first set of relative comparison values.

18. A method of a disaggregated storage architecture, comprising:

receiving an Input/Output (IO) request comprising IO data;

generating IO metadata corresponding to the IO data;

determining at least one controller parameter for each of a plurality of controllers, the plurality of controllers being operatively coupled to at least one client device of a plurality of client devices via a network of the disaggregated storage architecture;

determining a first priority weight for the at least one controller parameter based on a network type of the network of the disaggregated storage architecture;

determining a first IO management weight based on the at least one controller parameter and corresponding first priority weights;

mapping the IO metadata and the IO data to at least one controller of the plurality of controllers based on the first IO management weight, determining one or more storage node parameters for each of a plurality of storage nodes of the disaggregated storage architecture, determining a second priority weight of each storage node parameter of the one or more storage node parameters based on the network type of the network of the disaggregated storage architecture, determining a second IO management weight for each of the plurality of storage nodes based on the one or more storage node parameters and corresponding second priority weights, determining a first set of relative comparison values of the second IO management weights by comparing the second IO management weights of the plurality of storage nodes, statically mapping the IO metadata to at least one storage node from the plurality of storage nodes based on the first set of relative comparison values, and dynamically storing the IO data at one or more storage nodes from the plurality of storage nodes based on the first set of relative comparison values.

* * * * *